United States Patent
Peters et al.

(10) Patent No.: US 9,003,771 B2
(45) Date of Patent: Apr. 14, 2015

(54) STATIC MIXER FOR AN EXHAUST GAS SYSTEM OF AN INTERNAL COMBUSTION ENGINE-DRIVEN VEHICLE, IN PARTICULAR MOTOR VEHICLE

(75) Inventors: Axel Peters, Freising (DE); Marko Buder, Ingolstadt (DE); Stefan Gerdon, Hayna (DE); Stefan Kohrs, Neustadt (DE); Manfred Doll, Neustadt (DE)

(73) Assignee: Audi AG, Ingolstadt (DE)

( * ) Notice: Subject to any disclaimer, the term of this patent is extended or adjusted under 35 U.S.C. 154(b) by 423 days.

(21) Appl. No.: 12/682,219

(22) PCT Filed: Oct. 7, 2008

(86) PCT No.: PCT/EP2008/008436
§ 371 (c)(1),
(2), (4) Date: Jul. 12, 2010

(87) PCT Pub. No.: WO2009/049790
PCT Pub. Date: Apr. 23, 2009

(65) Prior Publication Data
US 2010/0293931 A1   Nov. 25, 2010

(30) Foreign Application Priority Data

Oct. 9, 2007   (DE) .................. 10 2007 048 558

(51) Int. Cl.
| | |
|---|---|
| *F01N 3/00* | (2006.01) |
| *B01D 53/94* | (2006.01) |
| *B01F 3/04* | (2006.01) |
| *B01F 5/06* | (2006.01) |
| *F01N 3/28* | (2006.01) |

(52) U.S. Cl.
CPC ........ *B01D 53/9431* (2013.01); *B01F 3/04021* (2013.01); *B01F 5/0616* (2013.01); *F01N 3/2892* (2013.01); *F01N 2240/20* (2013.01)

(58) Field of Classification Search
CPC ............ B01D 53/9431; B01F 3/04021; B01F 5/0616; F01N 3/2892; F01N 2240/20
USPC ........... 60/317, 324, 286, 295, 285, 287, 288; 366/338, 181.5
See application file for complete search history.

(56) References Cited

U.S. PATENT DOCUMENTS

| | | | | |
|---|---|---|---|---|
| 4,255,124 | A | * | 3/1981 | Baranowski, Jr. ............ 431/353 |
| 5,489,153 | A | * | 2/1996 | Berner et al. ................. 366/337 |
| 5,526,462 | A | | 6/1996 | Kondo et al. |
| 7,908,845 | B2 | * | 3/2011 | Brown et al. .................. 60/286 |
| 2007/0204751 | A1 | * | 9/2007 | Wirth et al. .................... 96/290 |
| 2011/0258983 | A1 | * | 10/2011 | Vosz ............................. 60/274 |

FOREIGN PATENT DOCUMENTS

| | | |
|---|---|---|
| CN | 101029590 A | 9/2007 |
| DE | 19922355 A1 | 11/2000 |

(Continued)

*Primary Examiner* — Thomas Denion
*Assistant Examiner* — Matthew T Largi
(74) *Attorney, Agent, or Firm* — Novak Druce Connolly Bove + Quigg LLP

(57) ABSTRACT

The invention relates to a static mixer for an exhaust gas system of an internal combustion engine-driven vehicle, with a plurality of flow guide elements which influence the flow of an exhaust gas stream and which are inclined at a given angle relative to the mixer plane and are held in the exhaust gas channel by means of at least one retaining strip. According to the invention the at least one retaining strip is made resilient at least in partial regions and/or is elastically supported in the plane of the mixer.

4 Claims, 2 Drawing Sheets

(56) References Cited

FOREIGN PATENT DOCUMENTS

| DE | 102006058715 B3 | 1/2008 |
| EP | 1 712 751 A2 | 10/2006 |
| EP | 1712751 A2 * | 10/2006 |
| EP | 1830042 A | 9/2007 |
| WO | 2008061734 A | 5/2008 |
| WO | 2008104350 A | 9/2008 |
| WO | 2008135112 A | 11/2008 |

* cited by examiner

STATIC MIXER FOR AN EXHAUST GAS SYSTEM OF AN INTERNAL COMBUSTION ENGINE-DRIVEN VEHICLE, IN PARTICULAR MOTOR VEHICLE

CROSS-REFERENCE TO RELATED APPLICATIONS

This application is a 35 U.S.C. 371 National Stage of PCT/EP2008/008436 filed on Oct. 7, 2008, which claims priority from German Patent Application No. 10 2007 048 558.3 filed on Oct. 9, 2007, the entire disclosures of which are hereby incorporated by reference.

The invention relates to a static mixer for an exhaust gas system of an internal combustion engine-driven vehicle.

BACKGROUND OF THE INVENTION

It is generally known that, in conjunction with exhaust emission control systems for reducing nitrogen oxide emissions, so-called selective catalytic reduction (SCR) is used in which NOx conversion in a lean atmosphere is achieved by means of specially tuned catalytic converters. To reduce NOx, a suitable reducing agent is introduced into the exhaust gas flow in order to obtain final products such as $N_2$, $CO_2$ and $H_2O$. For example, ammonia or urea is used as the reducing agent in concert with active SCR catalytic converters. For mixing of the reducing agent with the exhaust gas, a static mixer is conventionally used, by means of which the desired distribution of the reducing agent in the exhaust gas flow for efficient exhaust emission control is to be achieved.

U.S. Pat. No. 5,489,153 already discloses a generic static mixer for a flow channel which has a plurality of so-called deflection elements in the flow channel. The deflection elements here are arranged in rows on a rectangular supporting grid. By means of this static mixer, the incoming flow is to be deflected by the deflection elements in different directions, the deflection elements generating a transverse flow—relative to the primary direction of flow—in the individual openings of the supporting grid. Especially effective mixing is thereby to be achieved by the production of swirls, in particular by the formation of rotating vortices. But the problem in conjunction with a static mixer of this type having a rectangular grid structure is that cracks and failures in the supporting grid region of the mixer can occur at very high exhaust gas temperatures and/or during temperature changes with large gradients.

Therefore, the object of this invention is to provide a static mixer for an exhaust gas system of an internal combustion engine-driven vehicle, in particular a motor vehicle, by means of which the risk of mixer damage is to be reduced in a structurally simple and operationally reliable manner.

SUMMARY OF THE INVENTION

According to the invention, the at least one retaining strip is made resilient at least in partial regions and/or is elastically supported in the plane of the mixer. With this configuration, temperature-induced stresses due to material expansion and thus failures of the mixer can be prevented in a manner which is simple in terms of construction and production technology, since the resilient retaining strip areas can reversibly equalize the expansions.

Preferably, the at least one retaining strip is made curved to form resilient regions in given regions of the retaining strip; in particular, the regions of curvature are each formed by a retaining strip region which is curved in an S shape (S-turn). With these curved retaining strips a rectangular grid arrangement, as is the case in the generic prior art, is advantageously avoided. As tests by the inventors have shown, especially with the curved execution of the retaining strips or individual regions of the retaining strips, mixers can be made with which elastic expansion equalization, especially at high exhaust gas temperatures, and thus the risk of damage to the static mixer, can be greatly reduced.

Especially preferably, there are several retaining strips which run in different directions, preferably more or less transversely to one another and which thus are arranged in the mixer plane such that at least one of the retaining strips is fixed with at least one attachment region, in particular one end region of the retaining strip, on another retaining strip. Specifically, according to one preferred configuration it is provided that at least one retaining strip is arranged as an intermediate retaining strip between two further spaced retaining strips, which preferably run essentially transversely thereto as attachment retaining strips; in particular, said retaining strip is fastened therewith the end regions of the retaining strips. In this connection, linking of at least one retaining strip to at least one other retaining strip in the curvature region is especially advantageous, especially in a roof-shaped or hat-shaped spring convexity thereof. In this way especially low-stress linking of retaining strips is advantageously made available, with which temperature-induced expansions and material deformations can be outstandingly accommodated and equalized.

Furthermore, the at least one intermediate retaining strip according to one embodiment which has been strength-optimized thermomechanically can be linked to the two opposite retaining strip end regions in one curvature region, especially a roof-shaped or hat-shaped spring convexity of the spaced attachment retaining strips. Preferably, the curvature region, especially the spring recess of each of the two attachment retaining strips to which at least one intermediate retaining strip is linked, has a given gap distance from a mixer ring of the static mixer or an exhaust gas channel wall.

The attachment retaining strips are moreover made here preferably as identical parts; this leads to reduction of the diversity of components and to cost savings. This is detailed below in conjunction with another aspect which is essential for the invention.

According to this aspect, there are preferably several, especially two groups of retaining strips which are different with respect to the configuration of the retaining strips, at least one of these groups of retaining strips having a plurality of retaining strips which are made as identical parts within the respective group of retaining strips. The retaining strips of the different groups of retaining strips can then be arranged in a given configuration in the mixer plane. It is especially preferably provided that each of the groups of retaining strips has a plurality of retaining strips which are made as identical parts within the group of retaining strips.

With this type of configuration of the static mixer, a static mixer can be implemented with a structure which is simple in terms of production technology and component engineering, since production costs can be advantageously reduced by making identical parts. By providing several, especially two different groups of retaining strips, moreover, it can be easily ensured that different desired configurations for a static mixer can be provided. In particular, these mixers can thus be configured in a form with which the above-described elastic expansion equalization, especially at high exhaust gas temperatures, and thus the risk of damage of the static mixer, can be significantly reduced.

According to one preferred specific configuration, a first group of retaining strips has a plurality of retaining strips which are made as identical parts and which have several single-vane guide vanes which are spaced apart from one another as flow guide elements. Especially preferably in this connection, it is provided that the guide vanes are all arranged on the same side of the mixer plane and thus project away from this side of the mixer plane. On this side of the mixer plane the guide vanes, however, project in alternation in opposite directions, inclined at a given angle relative to the mixer plane. The single-vane guide vanes are preferably made plate-shaped and/or blade-shaped. Especially good and effective mixer results can be achieved with this mixer geometry.

According to one specific configuration the retaining strips are held spaced apart and parallel to one another in the mixer plane so that the individual guide vanes of the retaining strips lie behind one another such that they form several rows of guide vanes in the mixer plane and, as explained above, preferably without a rectangular grid structure of the retaining strips. The individual guide vanes of the retaining strips preferably lie behind one another such that the individual rows of guide vanes point alternately in opposite directions. In this way outstanding mixer results can be achieved.

One configuration of the retaining strips of a second group of retaining strips, which configuration is suitable for this specific embodiment of the first group of retaining strips, calls for several retaining strips of this second group of retaining strips to run essentially transversely to the retaining strips of the first group of retaining strips, these retaining strips of the second group of retaining strips preferably having such a number of single-vane guide vanes consisting of flow guide elements at such positions that the guide vane gaps in an edge region of the mixer plane can be closed in the rows of guide vanes which are formed by the guide vanes of the retaining strips of the first group of retaining strips; i.e., the guide vanes of the retaining strips of the second group of retaining strips thus form a component of the rows of guide vanes.

The retaining strips are fastened preferably by means of a spot weld, either on a mixer ring or on an exhaust gas channel wall of the exhaust gas line.

In particular, for preliminary fixing or premounting of the mixer, the retaining strips according to one especially preferred configuration can moreover be connected to one another in their crossing regions by a slip-in slot connection.

Likewise, the retaining strips can be fixed beforehand by means of a slip-in slot connection or other catch fastening on a mixer ring so that they can be provisionally fastened, for example, by welds.

A metal or sheet metal material is conventionally used as the preferred material for such a static mixer.

The invention is detailed below using the drawings.

DETAILED DESCRIPTION OF THE PREFERRED EMBODIMENTS OF THE INVENTION

Figure 1:
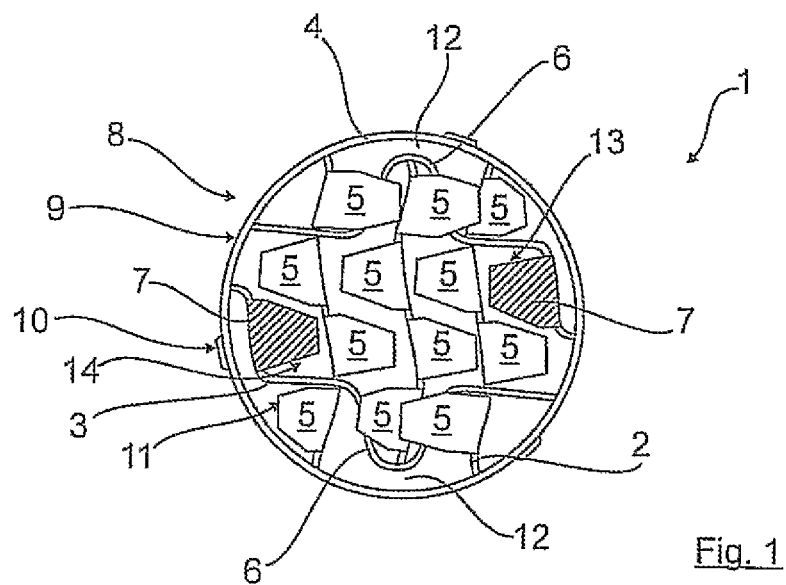
FIG. 1 schematically shows a top view of a static mixer according to the invention.
Figure 3:
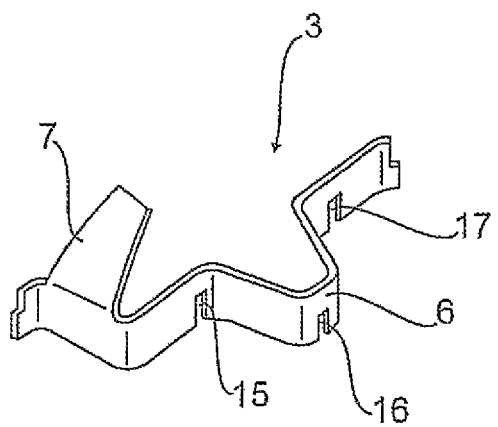
Figure 4:
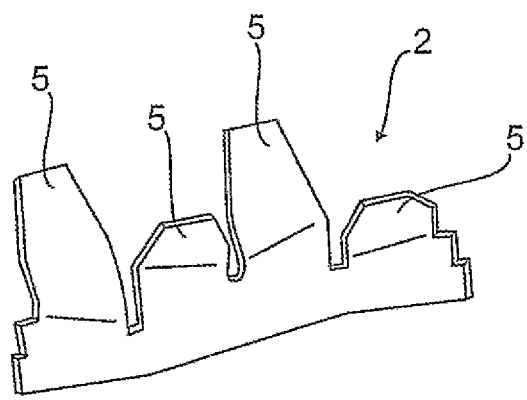

FIG. 1 schematically shows a top view of the static mixer 1 according to the invention which, as is shown especially in a combined examination of FIGS. 3 and 4, is made of three retaining strips 2 of a first group of retaining strips, which strips 2 are made as identical parts, and of two retaining strips 3 of a second group of retaining strips, which strips 3 are made as identical parts, and which are held in a mixer ring 4 of the static mixer in a manner which is to be detailed below.

As can be taken from FIG. 4, the retaining strips 2 each have an essentially S-shaped curvature, viewed in the longitudinal direction of the retaining strips there being several single-vane, plate-like guide vanes 5 which are spaced apart from one another. These guide vanes 5 each project from the same side of the retaining strips 2 and thus, in the mounted state, as is apparent from FIG. 1, from the same side of the mixer plane, the individual guide vanes viewed in just the longitudinal direction of the retaining strips pointing in alternation in the opposite direction and being inclined at a given angle relative to the mixer plane.

The retaining strips 3 of the second group of retaining strips, which are shown in FIG. 3, are likewise made curved and have a hat-shaped convexity 6 approximately in the middle region—relative to the longitudinal direction of the retaining strips. In an end region of the retaining strip 3, which is the left region in the plane of FIG. 3, there is furthermore a guide vane which is made plate-shaped and which is inclined likewise at a given angle.

Figure 2:
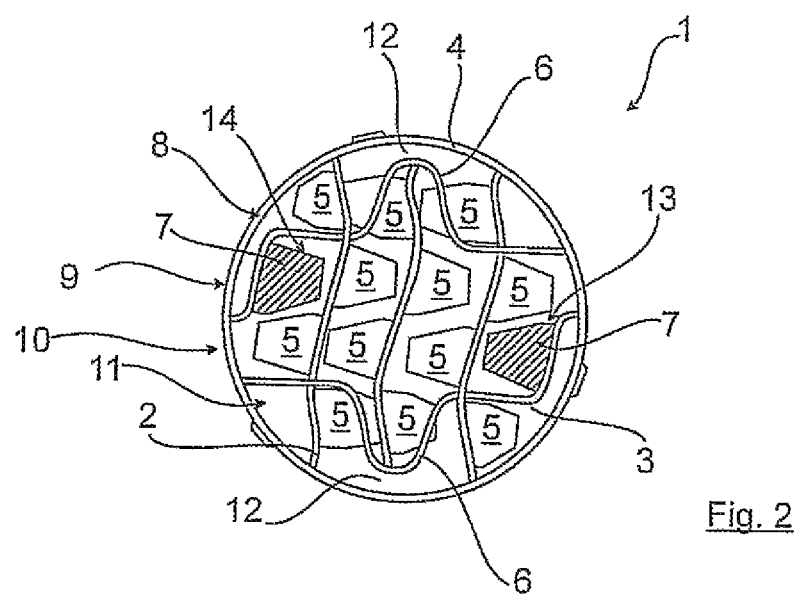
FIG. 2 shows a rear view of the static mixer as shown in FIG. 1, FIG. 3 schematically shows one version of a retaining strip of a first group of retaining strips, and FIG. 4 schematically shows one version of a retaining strip of a second group of retaining strips.

As is apparent especially from FIG. 1 at this point in concert with FIG. 2, the retaining strips 2 of the first group of retaining strips are spaced apart from one another in the mounted state and are aligned running essentially parallel to one another such that the individual guide vanes 5 in the mixer plane formed by the mixer ring 4 form rows 8, 9, 10, and 11 of guide vanes, the guide vanes of the retaining strips 2 of each row 8, 9, 10, 11 of guide vanes lying behind one another and being aligned or inclined pointing in the same direction.

As can furthermore be taken from FIGS. 1 and 2, this yields rows 8, 9, 10, 11 of guide vanes, which likewise point in alternation in opposite directions due to the special configuration of the retaining strips 2 together with the guide vanes 5 which are located thereon and which point in the opposite direction, such that the rows of guide vanes which are directly adjacent to one another each have guide vanes 5 which point in the opposite direction.

Conversely, the retaining strips 3 (indicated in FIGS. 1 and 2 by thick black lines and crosshatched guide vanes) of the second group of retaining strips are mounted running essentially transversely to the retaining strips 2 of the first group of retaining strips in the mixer ring 4, the two retaining strips 3 being arranged offset against one another and rotated 180° in the mixer plane which is formed by the mixer ring 4 such that the convexities 6 end with a given gap distance 12 in front of the mixer ring 4. As can further be taken from FIGS. 1 and 2, by this arrangement of the retaining strips 3 their guide vane 7 travels into the guide vane gaps 13, 14 which are made by the configuration of the retaining strips 2 together with their guide vanes 5, as dictated by the design, so that the guide vanes 7 of the retaining strips 3 "seamlessly" join the rows 9, 10 of guide vanes and complete these rows of guide vanes.

As can further be taken from FIGS. 1 and 2, the middle retaining strip 3 is fastened with the free ends in the region of the convexities 6, for example by welding, while the free ends of the remaining retaining strips 2, in the same manner as the free ends of the retaining strips 3, are connected to the inside of the mixer ring 4 by means of spot welds, for example.

As can further be taken from FIGS. 3 and 4, on the retaining strips 3 there are moreover slotted recesses 15, 16, and 17 which accommodate and surround the correspondingly assigned regions of the retaining strips 2, as a result of which they are connected to one another in the form of a slip-in connection and can be, for example, easily fixed and mounted beforehand. Moreover, it is ensured in this way that the guide vanes 5, 7 of the retaining strips 2, 3 in the mounted state of the mixer 1 lie essentially in the same horizontal plane.

The invention claimed is:

1. A static mixer for the exhaust system of an internal combustion engine, comprising:
   a circular member;
   a pair of spaced, identically configured first strips disposed in a stratum of said circular member, each having a base section provided with an undulating configuration and a single vane, said single vane being disposed at an end thereof and at an angle relative to the base section thereof, and the ends of the base section being secured to said circular member; and
   a set of spaced identically configured second strips disposed in said stratum, each transversely relative to said first strips, having undulating configurations,
   wherein one of said second strips interconnects said first strips and is provided, with a set of spaced vanes alternatively projecting laterally at angles relative to a base section thereof; another one of said second strips is spaced on one side of said one second strip interconnecting said first strips and is provided with a set of spaced vanes alternatively projecting laterally at an angle relative to a base section thereof and interleaving the vanes of said one second strip and the vane of one of said first strips; and a further one of said second strips is spaced on the other side of said one second strip interconnecting said first strips and is provided with a set of spaced vanes alternatively projecting laterally at angles relative to a has section thereof and interleaving the vanes of said one second strip and the vane of the other of said first strips.

2. The static mixer according to claim 1 wherein each of said first strips is provided with projecting, intermediate curved portions to which said one of said second strips is connected.

3. The static mixer of claim 1 wherein the connections of said strips together includes a slit provided in the base section of one of said slits and a portion of the base section of another one of said strips being inserted into said slot.

4. The static mixer according to claim 1 wherein said circular member and said strips are formed of a metal and said first strips are spot welded to said circular member.

* * * * *